US012186881B2

(12) United States Patent
Windsheimer et al.

(10) Patent No.: US 12,186,881 B2
(45) Date of Patent: Jan. 7, 2025

(54) HAND-HELD POWER TOOL HAVING AN ALIGNMENT APPARATUS

(71) Applicant: Robert Bosch GmbH, Stuttgart (DE)

(72) Inventors: Ralf Windsheimer, Stuttgart (DE); Suresh Subramaniam, Stuttgart-Weilimdorf (DE); Thomas Hampel, Magstadt (DE); Scott Novotny, Weil Im Schoenbuch (DE); Petra Kalinowski, Stuttgart (DE); Jan-Hendrik Heins, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 17/908,139

(22) PCT Filed: Mar. 22, 2021

(86) PCT No.: PCT/EP2021/057207
§ 371 (c)(1),
(2) Date: Aug. 30, 2022

(87) PCT Pub. No.: WO2021/191122
PCT Pub. Date: Sep. 30, 2021

(65) Prior Publication Data

US 2023/0142025 A1 May 11, 2023

(30) Foreign Application Priority Data

Mar. 25, 2020 (DE) ..................... 10 2020 203 834.1
Mar. 22, 2021 (DE) ..................... 10 2021 202 738.5

(51) Int. Cl.
*B25F 5/02* (2006.01)
*F21V 33/00* (2006.01)

(52) U.S. Cl.
CPC .......... *B25F 5/021* (2013.01); *F21V 33/0084* (2013.01)

(58) Field of Classification Search
CPC ........... B25F 5/02; B23B 49/00; B23B 45/14
(Continued)

(56) References Cited

U.S. PATENT DOCUMENTS 2,853,915 A * 9/1958 Mitchell .................. G01C 1/02 356/138
6,536,536 B1 * 3/2003 Gass ....................... B25F 5/021 173/171
(Continued)

FOREIGN PATENT DOCUMENTS

DE 10 2006 026 156 A1 12/2007
DE 10 2009 007 977 A1 7/2009
(Continued)

OTHER PUBLICATIONS

International Search Report corresponding to PCT Application No. PCT/EP2021/057207, mailed Jun. 25, 2021 (German and English language document) (7 pages).

*Primary Examiner* — Praachi M Pathak
(74) *Attorney, Agent, or Firm* — Maginot, Moore & Beck LLP

(57) ABSTRACT

A hand-held power tool includes a housing, in which at least one drive unit configured to drive a tool holder is arranged. The tool holder is designed to hold an insertable tool. The hand-held power tool includes an alignment apparatus having a control unit and at least one luminous element arranged on the housing. The alignment apparatus is designed to determine, in real time, during operation of the hand-held power tool, a current deviation of a selectable machining angle, which is selected via the control unit and which is formed between the insertable tool inserted in the tool holder and a workpiece surface that is to be machined, from an actual inclination angle between the insertable tool inserted in the tool holder and the workpiece surface to be machined,
(Continued)

and to visualize said deviation using the at least one luminous element.

20 Claims, 8 Drawing Sheets

(58) Field of Classification Search
USPC ................ 356/138; 83/520; 408/16; 362/119
See application file for complete search history.

(56) References Cited

U.S. PATENT DOCUMENTS

| | | | | |
|---|---|---|---|---|
| 7,182,148 | B1 | 2/2007 | Szieff | |
| 7,200,516 | B1 * | 4/2007 | Cowley | B23B 49/00 356/138 |
| 7,827,638 | B1 * | 11/2010 | Klick | B26B 13/22 7/127 |
| 8,004,664 | B2 * | 8/2011 | Etter | B25F 5/00 356/139.1 |
| 9,114,494 | B1 | 8/2015 | Mah | |
| 2005/0232713 | A1 * | 10/2005 | Turner | B25H 1/0092 408/16 |
| 2014/0361645 | A1 * | 12/2014 | Beyerl | B25B 21/00 310/50 |
| 2017/0225284 | A1 | 8/2017 | Bahr et al. | |
| 2019/0207539 | A1 * | 7/2019 | Westerby | H02P 3/22 |
| 2020/0078898 | A1 * | 3/2020 | Lamont | B23Q 17/225 |

FOREIGN PATENT DOCUMENTS

| | | | |
|---|---|---|---|
| DE | 10 2011 007 648 | A1 | 10/2012 |
| DE | 10 2012 221 997 | A1 | 11/2013 |
| DE | 10 2015 218 447 | A1 | 6/2016 |
| EP | 2 468 462 | A1 | 6/2012 |
| EP | 2 907 625 | A1 | 8/2015 |
| EP | 3 170 597 | A1 | 5/2017 |
| GB | 2 358 926 | A | 8/2001 |
| WO | 2019/063685 | A1 | 4/2019 |

* cited by examiner

HAND-HELD POWER TOOL HAVING AN ALIGNMENT APPARATUS

This application is a 35 U.S.C. § 371 National Stage Application of PCT/EP2021/057207, filed on Mar. 22, 2021 which claims the benefit of priority to Serial No. DE 10 2020 203 834.1, filed on Mar. 25, 2020 in Germany, and which claims the benefit of priority to Serial No. DE 10 2021 202 738.5, filed on Mar. 22, 2021 in Germany, the disclosures of which are incorporated herein by reference in their entirety.

BACKGROUND

The present disclosure relates to a hand-held power tool, in particular a drill driver, having a housing, in which at least one drive unit for driving a tool holder is arranged, wherein the tool holder is designed to hold an insertable tool.

GB 2 358 926 A discloses a hand-held power tool of this type which has a drive unit for driving a tool holder. In addition, this hand-held power tool is assigned an additional handle, which visualizes an alignment of the hand-held power tool. In this case, the additional handle can have LEDs which indicate the alignment of the additional handle or of the hand-held power tool in a manner similar to a spirit level.

SUMMARY

The disclosure relates to a hand-held power tool, in particular a drill driver, having a housing, in which at least one drive unit for driving a tool holder is arranged, wherein the tool holder is designed to hold an insertable tool. An alignment apparatus having a control unit and having at least one luminous element arranged on the housing is provided, wherein the alignment apparatus is designed to determine, in real time, during operation of the hand-held power tool, a current deviation of a machining angle, which can be selected via the control unit and which is to be formed between an insertable tool that is arrangeable in the tool holder and a workpiece surface that is to be machined by the insertable tool, from an actual inclination angle between the insertable tool that is arrangeable in the tool holder and the workpiece surface to be machined by the insertable tool, and to visualize said deviation by means of the at least one luminous element.

The disclosure thus makes it possible to provide a hand-held power tool in which the alignment apparatus enables the hand-held power tool to be aligned in a simple and uncomplicated manner at a desired angle to the machining surface. Improved handling of the hand-held power tool can thus be made possible.

The at least one luminous element is preferably designed at least to emit a first and a second luminous color. The first luminous color and the second luminous color are preferably different.

Thus, two alignments can be visualized in a simple and uncomplicated manner by the at least one luminous element emitting two different luminous colors.

The at least one luminous element preferably emits the first luminous color when the predetermined deviation exceeds a predetermined threshold value, and emits the second luminous color when the predetermined deviation is less than or equal to the predetermined threshold value.

Thus, arrangement of the hand-held power tool at the desired machining angle relative to the machining surface can be visualized in a simple manner.

The at least one luminous element is preferably arranged on an upper side of the housing, in particular an upper side of the housing which faces away from an associated handle.

Arrangement of the at least one luminous element comparatively close to a user of the hand-held power tool can thus be made possible in a simple and uncomplicated manner, enabling the user of the hand-held power tool to reliably recognize the emitted luminous color.

According to one embodiment, the at least one luminous element is arranged at an end of the housing remote from the tool holder and/or at an end adjacent to the tool holder.

Thus, a suitable position of the at least one luminous element can be specified in a simple manner.

The control unit preferably has at least one further luminous element.

Safe and reliable visualization can thus be made possible by the luminous elements.

At least one angle value is preferably stored in the control unit and can be selected as the selectable machining angle.

This enables simple and user-friendly operation of the alignment apparatus.

The control unit can preferably be coupled to an external device, wherein the selectable machining angle can be selected by means of the external device.

In this way, an alternative adjustment possibility can be provided for the alignment apparatus.

According to one embodiment, the control unit is arranged on an upper side, which faces the drive unit, of a base region of the housing of the hand-held power tool.

Thus, a suitable arrangement of the control unit can be made possible in a simple manner.

Working field lighting is preferably provided, which is assigned to the alignment apparatus, wherein the working field lighting has the at least one luminous element.

In this way, a compact alignment apparatus can be provided.

The control unit preferably has the working field lighting.

This enables simple and uncomplicated arrangement of the working field lighting.

The control unit has at least one further display element for displaying further functions, in particular a device temperature, a battery state and/or a connection status to an external device.

Thus, further functions for operation of the hand-held power tool can be set and visualized in a simple manner.

In addition, the present disclosure provides a method for aligning a hand-held power tool having an alignment apparatus, comprising the steps of:

a) arranging the hand-held power tool on a workpiece surface to be machined,
b) selecting a desired machining angle by means of the control unit,
c) initiating adjustment of the alignment apparatus,
d) starting alignment of the hand-held power tool at the selected machining angle, wherein the at least one luminous element emits a first luminous color as long as the actual inclination angle of the hand-held power tool exceeds a predetermined threshold value, and
e) terminating the alignment of the hand-held power tool when the actual inclination angle of the hand-held power tool corresponds to the selected machining angle and the at least one luminous element emits a second luminous color.

The disclosure thus makes it possible to provide a method for aligning a hand-held power tool in which the alignment apparatus enables the hand-held power tool to be aligned in a simple and uncomplicated manner at a desired angle to the machining surface.

The at least one luminous element preferably emits a third luminous color when the alignment apparatus is being adjusted.

Adjustment can thus be visualized in a simple and uncomplicated manner.

BRIEF DESCRIPTION OF THE DRAWINGS

The disclosure is explained in greater detail in the following description by means of exemplary embodiments illustrated in the drawings. In the drawings.

DETAILED DESCRIPTION

In the figures, elements with the same or a comparable function are provided with identical reference signs and are described in detail only once.

Figure 1:
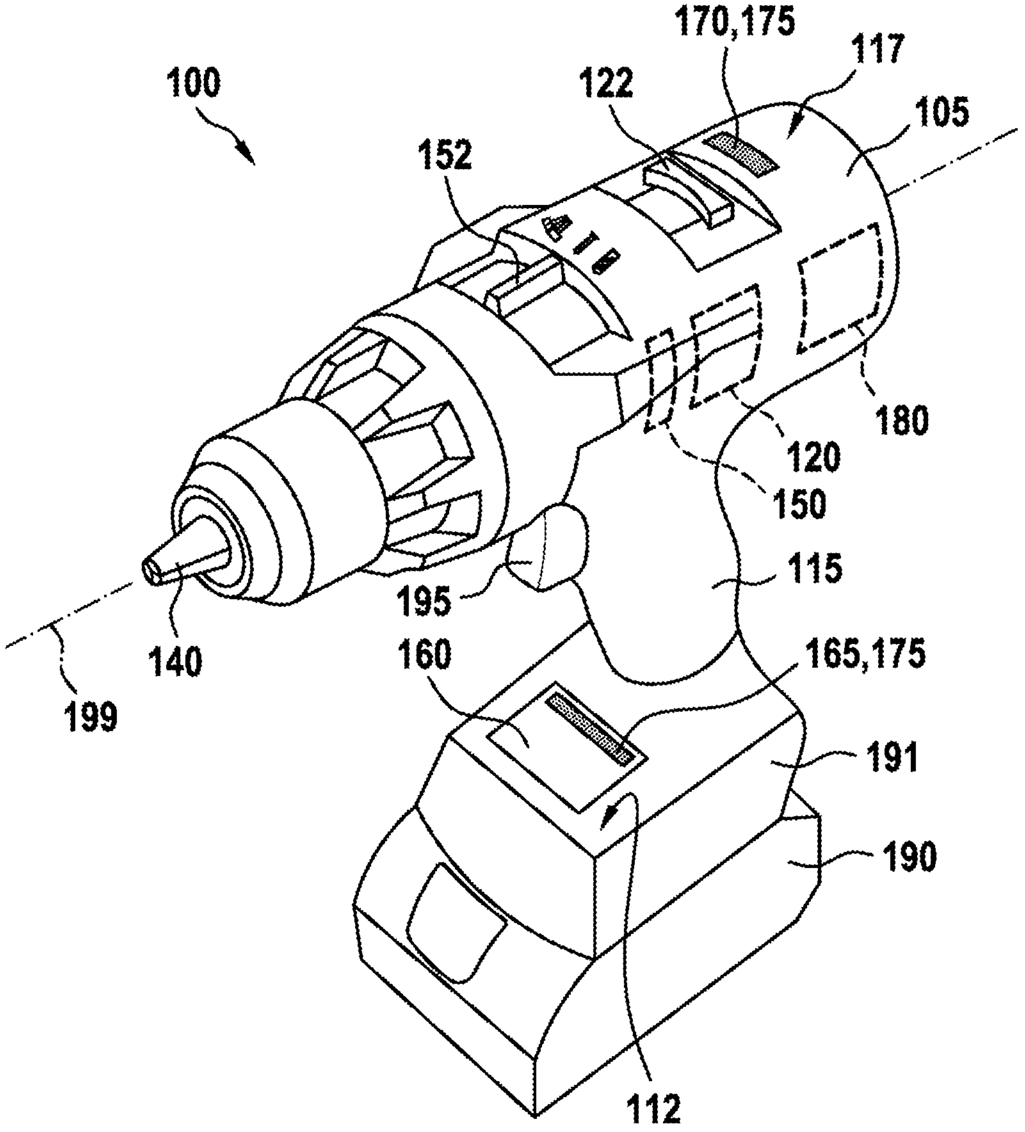
FIG. 1 shows a perspective view of a hand-held power tool having an alignment apparatus, to which a first and second luminous element are assigned.

FIG. 1 shows an exemplary hand-held power tool 100, which has a housing 105. The housing 105 preferably has a handle 115 which, by way of illustration, connects an upper side 117 and a base region 191 to one another. In this case, the upper side 117 is arranged on a side of the housing 105 which faces away from the handle 115.

A drive unit 120, 180 having at least one drive motor 180 is preferably arranged in the housing 105. The drive motor 180 is preferably designed as an electronically commutated motor. The drive motor 180 can preferably be switched on and off by means of a manual switch 195. The manual switch 195 is preferably arranged on the handle 115.

An optional transmission 120 is preferably assigned to the drive unit 120, 180. The transmission 120 is preferably designed as a planetary transmission. A control element 122 is assigned to the transmission 120 for the purpose of shifting gears.

The drive unit 120, 180 is preferably designed to drive a tool holder 140. By way of illustration, the tool holder 140 is constructed in the manner of a drill chuck, but can, for example, alternatively also form a tool attachment which is arranged detachably on the hand-held power tool 100.

Figure 5:
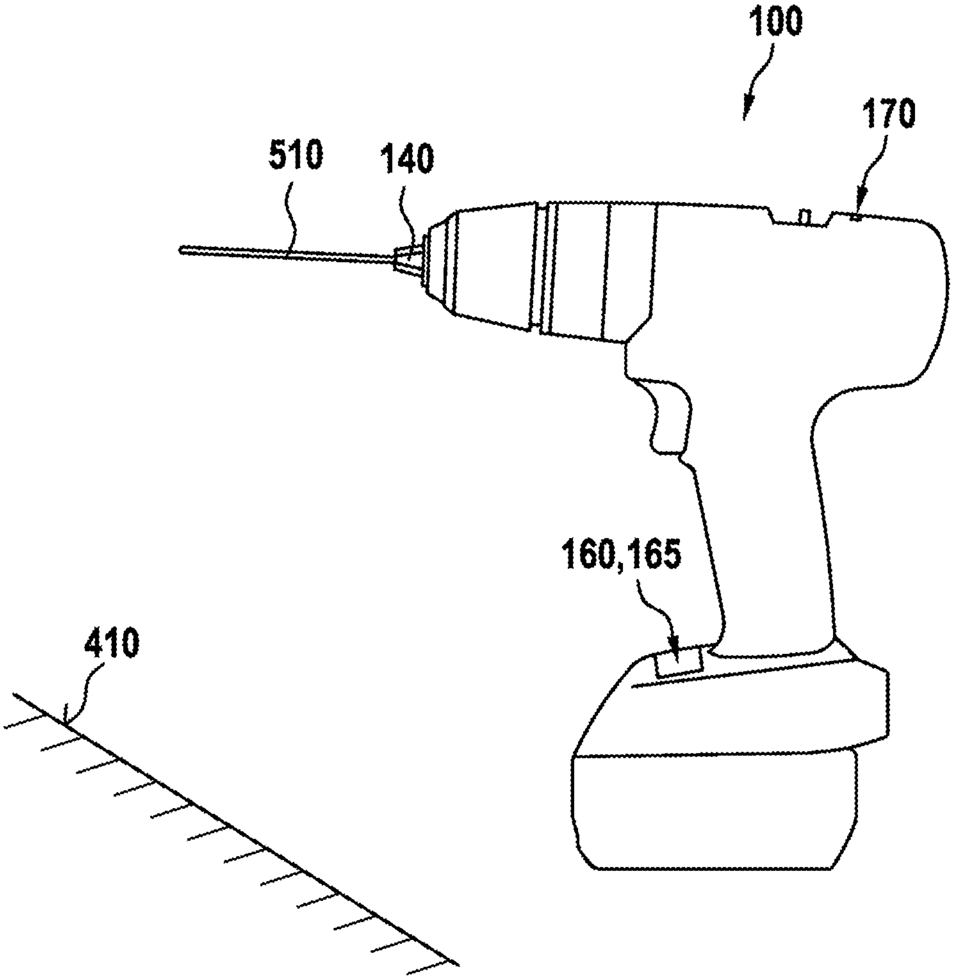
FIG. 5 shows a side view of the hand-held power tool of FIG. 4 during a second alignment step.

The tool holder 140 is preferably designed to hold an insertable tool (510 in FIG. 5). By way of example, the tool holder 140 is designed to hold insertable tools (510 in FIG. 5) with a round shank, a hex interface, an SDS and/or SDS plus interface. The tool holder 140 rotates about an axis of rotation 199 during operation.

Furthermore, an optional impact mechanism 150 is assigned to the drive unit 120, 180. Like the transmission 120, the impact mechanism 150 is assigned a control element 152, by means of which an operating mode can be set. In this case, it is possible, for example, to set a screwing mode, drilling mode and/or impact mode.

According to one embodiment, the hand-held power tool 100 can be connected mechanically and electrically to a rechargeable battery pack 190 for a power supply which is independent of the mains, but can alternatively also be operated from the mains, for example. The rechargeable battery pack 190 is arranged on the base region 191, in particular on a lower side of the base region 191 which faces away from the drive motor 180. The rechargeable battery pack 190 is preferably arranged detachably on the base region 191 by means of a rechargeable battery pack interface. With the rechargeable battery pack 190, the base region 191 preferably forms a stand of the hand-held power tool 100. However, the rechargeable battery pack 190 can also be firmly integrated into the housing 105 of the hand-held power tool 100.

An alignment apparatus 175 is preferably provided. By way of example, this has a control unit 160 and at least one luminous element 165, 170 arranged on the housing 105. It is pointed out that the alignment apparatus 175 can have any desired number of luminous elements.

The alignment apparatus 175 is preferably assigned two luminous elements 165, 170. The alignment apparatus 175 is designed to determine and visualize a current deviation between a selectable machining angle (310, 312, 314, 316 in FIG. 3) and an actual inclination angle (a in FIG. 6) of the hand-held power tool 100 in a working mode of the hand-held power tool 100. In the context of the present disclosure, the working mode also includes alignment of the hand-held power tool 100, during which the drive motor 180 is not activated.

To determine the actual inclination angle (a in FIG. 6) of the hand-held power tool 100, a sensor is preferably assigned to the hand-held power tool 100. The sensor is preferably an acceleration sensor. The acceleration sensor preferably determines proportionally the gravitational acceleration in the three spatial directions, which are in each case aligned perpendicular to one another. The inclination angle (a in FIG. 6) can be determined as a function of the proportions of the gravitational acceleration in the three spatial directions.

The selectable machining angle (310, 312, 314, 316 in FIG. 3) can preferably be selected by means of the control unit 160. The selectable machining angle (310, 312, 314, 316 in FIG. 3) is formed between the insertable tool (510 in FIG. 5), which can be arranged in the tool holder 140, and a workpiece surface (410 in FIG. 4) to be machined by means of the insertable tool. The inclination angle (a in FIG. 6) is preferably formed between the insertable tool (510 in FIG. 5), which can be arranged in the tool holder 140, and the workpiece surface (410 in FIG. 4) to be machined with the insertable tool. The alignment apparatus 175 preferably determines the current deviation between the set machining angle and the actual inclination angle in real time. In this case, the current deviation is preferably visualized by means of at least one, preferably two, luminous elements 165, 170.

Figure 7:
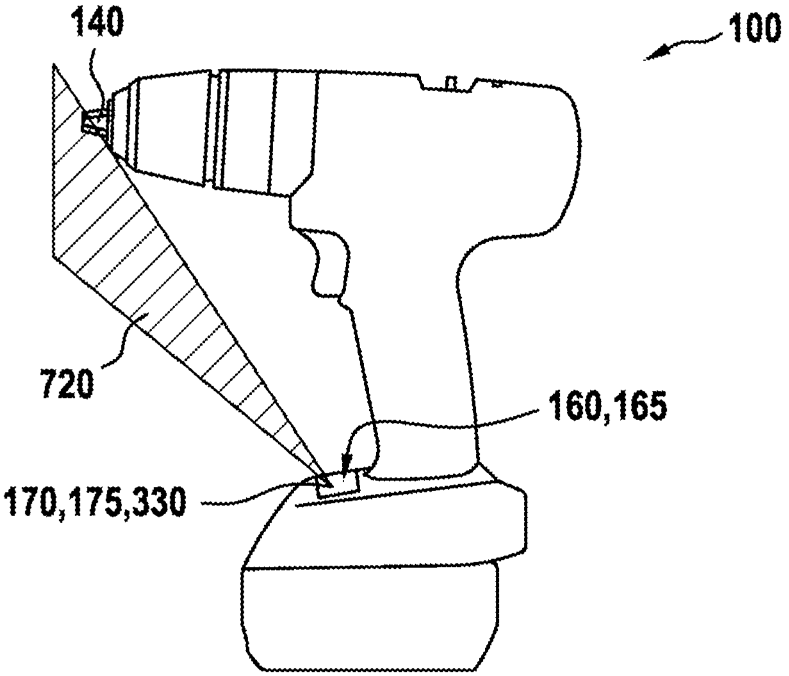
FIG. 7 shows a side view of the hand-held power tool of FIG. 1 with an alternative alignment apparatus during a first alignment step.
Figure 8:
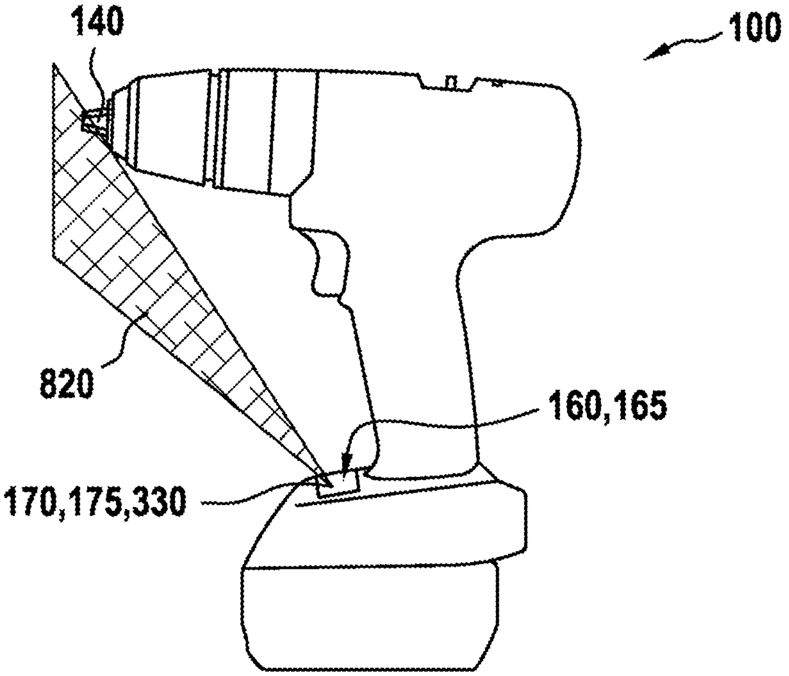
FIG. 8 shows a side view of the hand-held power tool of FIG. 7 with an alternative alignment apparatus during a second alignment step.
Figure 9:
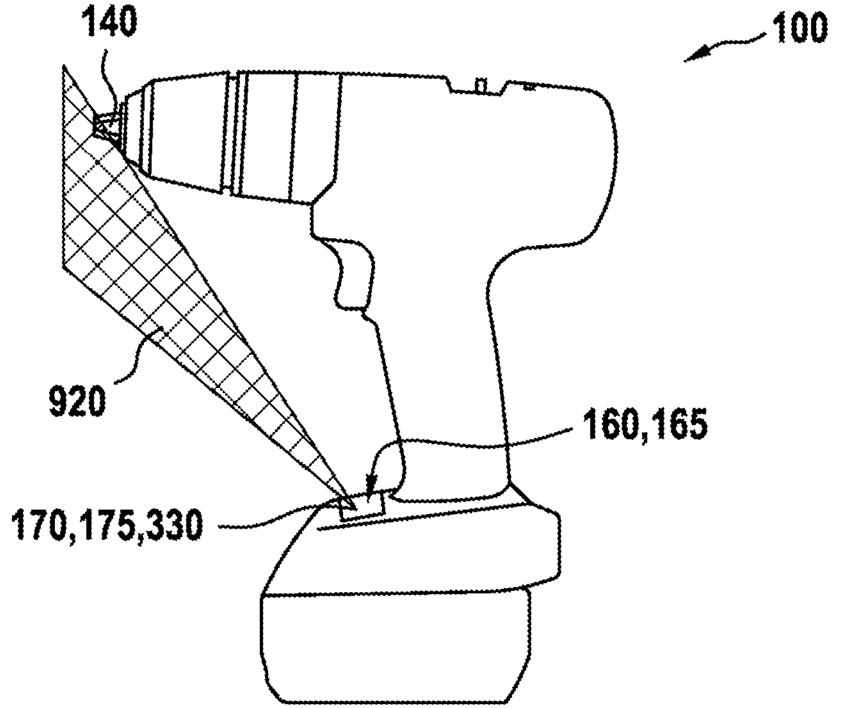
FIG. 9 shows a side view of the hand-held power tool of FIG. 7 and FIG. 8 when a set machining angle is reached.

According to one embodiment, the at least one luminous element 165, 170 is designed at least to emit a first and a second luminous color (720 in FIG. 7, 820 in FIG. 8, 920 in FIG. 9). The at least one luminous element 165, 170 preferably emits the first luminous color (820 in FIG. 8) when the predetermined deviation exceeds a predetermined threshold value. Furthermore, the at least one luminous element 165, 170 preferably emits the second luminous color (920 in FIG. 9) when the predetermined deviation is less than or equal to the predetermined threshold value. According to one embodiment, the first luminous color is yellow and the second luminous color is green.

The threshold value is preferably 3°, and therefore a maximum deviation of +/−3° from a set machining angle is possible with respect to the second luminous color. That is to say that, given a set machining angle of, for example, 30°, the at least one luminous element 165, 170 lights up in the second luminous color in an angular range of 27° to 33°. If the deviation is greater, i.e. the predetermined threshold value of 3° is exceeded, then the at least one luminous element 165, 170 lights up in the first luminous color.

According to one embodiment, analogously to this, the second luminous color can also be assigned a second threshold value, which is preferably 10°. That is to say that, in the example described above, given a set machining angle of 30°, the at least one luminous element 165, 170 lights up in the first luminous color in an angular range of 20° to 27° and of 33° to 40°. In this case, when the second threshold value is exceeded, the at least one luminous element 165, 170 can be switched off, for example.

It is pointed out that the threshold values mentioned are of a purely illustrative character and do not serve to restrict the disclosure. On the contrary, the first and second threshold values can also assume other values.

The at least one luminous element 170 is preferably arranged on the upper side 117 of the housing 105. In this case, the upper side 117 is arranged, as described above, such that it faces away from the handle 115. By way of illustration, the luminous element 170 is arranged at an end of the housing 105 or of the upper side 117 remote from the tool holder 140. Along the axis of rotation 199 of the tool holder 140, the luminous element 170 is arranged between the control element 122 of the transmission 120 and the end of the housing 105 remote from the tool holder 140.

Figure 2:
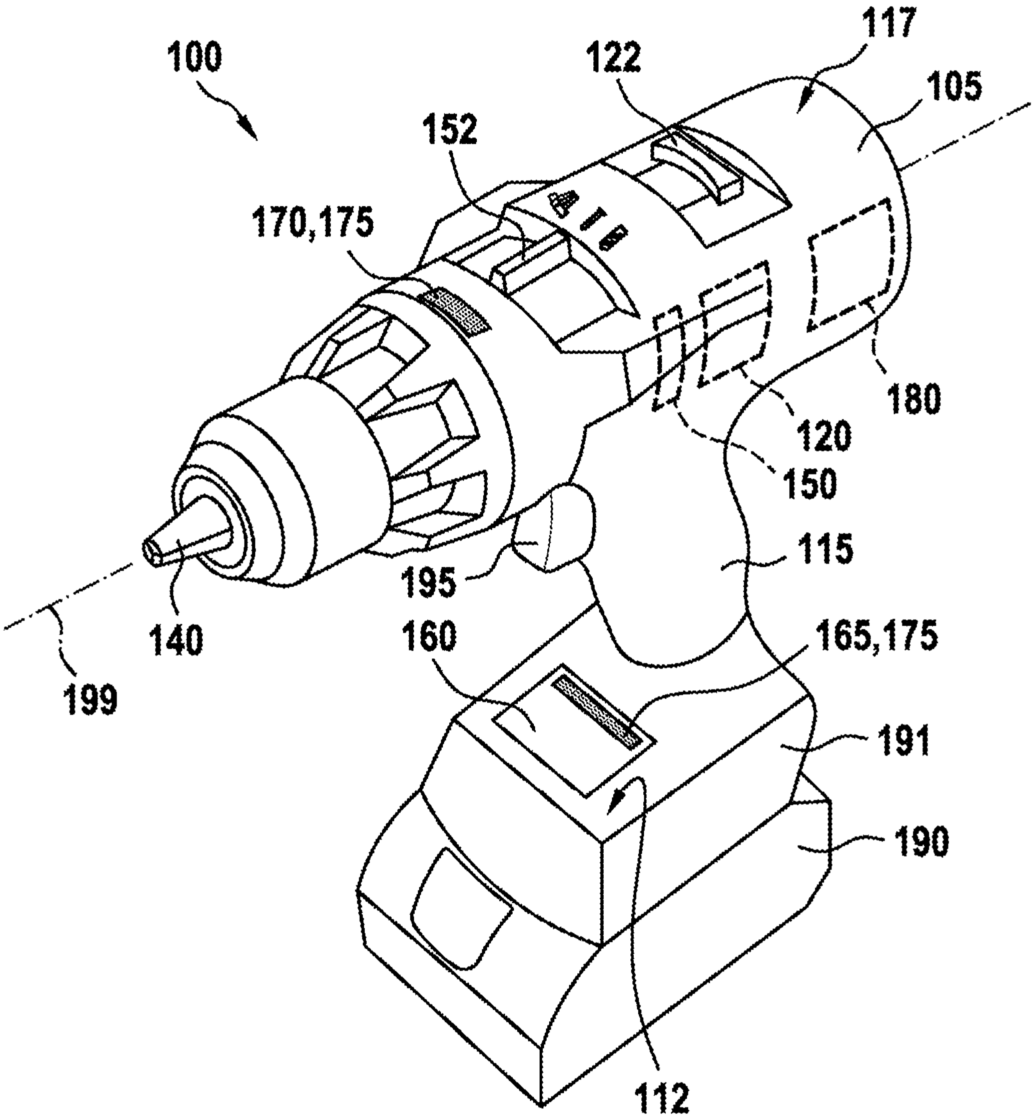
FIG. 2 shows a perspective view of the hand-held power tool having the alignment apparatus of FIG. 1 with an alternative arrangement of a luminous element.

According to a further embodiment, the luminous element 170 can be arranged at an end of the housing 105 adjacent to the tool holder 140, as shown in FIG. 2. Furthermore, a luminous element 170 can be arranged at an end of the housing 105 or of the upper side 117 remote from the tool holder 140 and at an end of the housing 105 adjacent to the tool holder 140.

The control unit 160 preferably has at least one luminous element 165. According to one embodiment, at least one angle value is stored in the control unit 160 and can be selected as the selectable machining angle (310, 312, 314, 316 in FIG. 3). Machining angles of 30°, 60°, 90° are preferably stored. However, other or further additional machining angles can also be stored. Thus, for example, two preset machining angles of 45° and 60° and a freely selectable machining angle can be stored, or three preset machining angles of 30°, 60° and 90° and a freely selectable machining angle can be stored. Further combinations of preset and freely selectable machining angles are also conceivable.

Moreover, the control unit 160 can preferably be couplable to an external device. In this case, the selectable machining angle (310, 312, 314, 316 in FIG. 3) can preferably be selected by means of the external device. The external device is preferably a PC, smartphone, etc., to which an application for selecting and setting at least one machining angle is assigned.

By way of illustration, the control unit 160 is arranged on an upper side 112, facing the drive unit 120, 180, of the base region 191 of the housing 105 of the hand-held power tool 100. As an alternative to this, the control unit 160 can also be arranged on the upper side 117 or on an end side of the housing 105 which faces away from the tool holder 140. Furthermore, the control unit 160 can also be arranged on one side of the housing 105, perpendicular to the axis of rotation 199, on the rechargeable battery pack 190, or at any other desired point of the hand-held power tool 100.

Working field lighting (330 in FIG. 3) is preferably provided. The working field lighting (330 in FIG. 3) is preferably assigned to the alignment apparatus 175. In this case, the working field lighting (330 in FIG. 3) preferably has the at least one luminous element 170.

Figure 3:
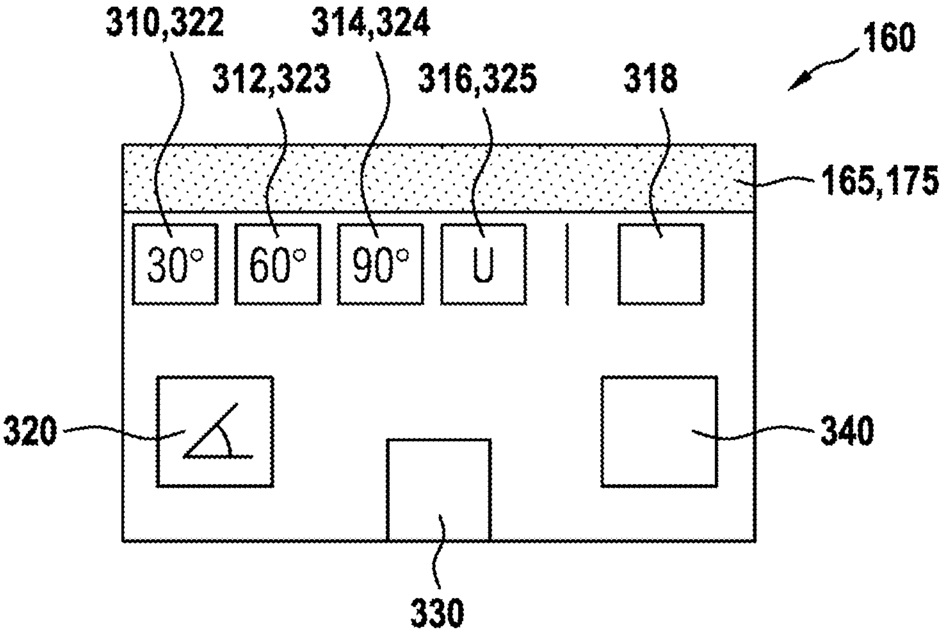
FIG. 3 shows a plan view of a control element assigned to the alignment apparatus of FIG. 1 and FIG. 2.

The control unit 160 preferably has the working field lighting (330 in FIG. 3). In addition, the control unit 160 has at least one further display element (318 in FIG. 3) for displaying further functions, in particular a device temperature, a battery state and/or a connection status to an external device.

By way of example, the hand-held power tool 100 is designed as a drill driver and, by way of illustration, has an optional impact mechanism 150. However, the hand-held power tool 100 can also be designed as a hammer drill with the optional impact mechanism 150. However, it is pointed out that the present disclosure is not restricted to drill drivers but can be used more generally in various hand-held power tools, with and without impact mechanisms, which have the alignment apparatus 175.

When aligning the hand-held power tool 100 with the alignment apparatus 175, the hand-held power tool 100 is preferably first arranged with a reference surface (420 in FIG. 4) on a workpiece surface (410 in FIG. 4) to be machined. A lower side, i.e. a side of the rechargeable battery pack 190 which is directed away from the handle 115, preferably forms the reference surface (420 in FIG. 4). It is pointed out that the reference surface (420 in FIG. 4) can be any desired, preferably flat, surface of the hand-held power tool 100, e.g. the lower side, the upper side 117, an end face and/or a side perpendicular to the axis of rotation 199. In addition, the hand-held power tool 100 can also have a plurality of reference surfaces (420 in FIG. 4).

A desired machining angle (310, 312, 314, 316 in FIG. 3) is then set by means of the control unit 160. Adjustment of the alignment apparatus 175 is then initiated. According to one embodiment, the at least one luminous element 165, 170 emits a third luminous color (720 in FIG. 7) when the alignment apparatus 175 is being adjusted. The at least one luminous element 165, 170 preferably flashes in the third luminous color during initiation. After this, the at least one luminous element 165, 170 goes out. The third luminous color is preferably blue, although green is also possible.

It is pointed out that the luminous colors described are of a purely illustrative character and are not to be regarded as a restriction of the present disclosure. Thus, the first, second and/or third luminous color may also be any other color. In addition, it is also possible for a user of the hand-held power tool 100 to set or select a desired luminous color. It is also pointed out that setting of a desired machining angle and initiation can take place simultaneously or successively. Furthermore, setting of a desired machining angle and initiation can be accomplished by means of a respectively assigned actuating element. A respective actuating element can be provided for this purpose. Furthermore, setting can also be accomplished by means of a combination of buttons.

Alignment of the hand-held power tool 100 now begins. The at least one luminous element 165, 170 emits the first luminous color (820 in FIG. 8) as long as the actual inclination angle (a in FIG. 6) of the hand-held power tool 100 exceeds a predetermined threshold value. As described above, this may be the case exclusively in an associated angular range.

If the actual inclination angle (a in FIG. 6) of the hand-held power tool 100 corresponds to the selected machining angle (310, 312, 314, 316 in FIG. 3) within a predetermined deviation, the alignment of the hand-held power tool 100 is terminated. This is visualized in that the at least one luminous element 165, 170 lights up in a second luminous color (920 in FIG. 2).

According to one variant, visualization can also take place as a function of a flashing frequency. In this case, for example, the at least one luminous element 165, 170 can flash at different flashing frequencies instead of in different colors. During this process, by way of example, the at least one luminous element 165, 170 can be lit up continuously only when the set machining angle is reached.

In addition, a combination of different luminous colors and/or different flashing frequencies is also possible, e.g. fast and slow flashing in an associated color. Thus, for example, the at least one luminous element 165, 170 can flash in the first luminous color at a flashing frequency and can light up continuously in the second luminous color, etc. In addition, acoustic signaling can also take place.

FIG. 2 shows the hand-held power tool 100 with the alignment apparatus 175 of FIG. 1. According to a further embodiment, the at least one luminous element 170 arranged on the upper side 117 is arranged at an end of the housing 105 adjacent to the tool holder 140. By way of illustration, the luminous element 170 is arranged between the tool holder 140 and the control element 152 of the impact mechanism 150 along the axis of rotation 199 of the tool holder 140.

FIG. 3 shows the control unit 160 of the hand-held power tool 100 of FIG. 1 and FIG. 2. By way of example, the control unit 160 has a control element 320 for selecting a machining angle.

At least one angle value is preferably stored in the control unit 160 and can be selected as the selectable machining angle 310, 312, 314, 316. By way of illustration, a first machining angle 310 is assigned to a display field 322, a second machining angle 312 is assigned to a display field 323 and a third machining angle 314 is assigned to a display field 324. Preferably, the first machining angle is 30°, the second machining angle is 60° and the third machining angle is 90°. However, any other machining angles can also be stored. By pressing the control element 320 or a selected display field of the display fields 322, 323, 324, one of the predetermined machining angles 310, 312, 314 can be selected. In this case, the respectively selected display field 322, 323, 324 preferably lights up. Thus, one of the predetermined machining angles 310, 312, 314 can be selected by actuating the control element 320. With each actuation of the control element 320, the machining angle 310, 312, 314 is changed step by step. After the machining angles 310, 312, 314 have been changed step by step, the machining angle 310, 312, 314 is reset. For example, in a first actuation of the control element 320, machining angle 310 is set, in a second actuation of the control element 320, a change is made from machining angle 310 to machining angle 312, in a third actuation of the control element 320, a change is made from machining angle 312 to machining angle 314, and in a fourth actuation of the control element 320, a change can be made from machining angle 314 to machining angle 310 or to a machining angle 316, or the set machining angle 310, 312, 314, 316 can be reset. In addition, there is preferably a further display field 325, it being possible for a desired machining angle 316 to be entered via an external device in a user mode. Here, the display field 325 preferably displays a selected mode and/or angle value. The desired machining angle 316 can be selected by actuating the control element 320, as described above. For example, in a fifth actuation of the control element 320, it is possible to change from the machining angle 316 to the machining angle 310 or to reset the set machining angle 310, 312, 314, 316.

In the case where the control unit 160 is deactivated, actuation of the control element 320 first of all enables activation of the control unit 160. As soon as the control element 320 is actuated again, the machining angle 310 is set, as described above. Each time one of the machining angles 310, 312, 314, 316 is set, the associated display field 322, 323, 324, 325 can flash, for example with a luminous color. It is also conceivable for at least one of the luminous elements 165, 170 to flash during this process. During the flashing of the display field 322, 323, 324, 325 or one of the luminous elements 165, 170, the adjustment of the alignment apparatus 175 is initiated, as described above, in which the alignment apparatus 175 is aligned relative to the reference surface (420 in FIG. 4), see also FIGS. 4-6.

It is conceivable, for example, that three machining angles 310, 312, 314 are provided, so that in a first actuation of the control element 320, the machining angle 310 is set, in a second actuation of the control element 320, a change is made from the machining angle 310 to the machining angle 312, in a third actuation of the control element 320, a change is made from the machining angle 312 to the machining angle 314, and in a fourth actuation of the control element 320, the set machining angle 310, 312, 314 is reset.

Furthermore, an optional control element 340, by means of which further functions can be selected, is preferably provided. A display element 318 is assigned to the control element 340. The at least one further display element 318 is designed to display the further functions. Here, the display element clarifies further functions, such as, for example, a device temperature, a battery state and/or a connection status to an external device. In this case, it is possible, for example, for a function to be assigned a symbol which is displayed. In addition, a luminous element can be assigned which lights up and/or flashes.

According to one embodiment, the control unit 160 is assigned working field lighting 330, or is implemented by the latter. Alternatively, the working field lighting 330 can also be arranged at any other suitable point of the hand-held power tool 100, e.g. on an end face of the hand-held power tool 100.

Moreover, by way of illustration, the control unit 160 has the luminous element 165. By way of example, the luminous element 165 is formed in the manner of a bar along a longitudinal side of the control unit 160. As an alternative to this, the luminous element 165 can also be formed from a plurality of luminous elements. In this case, the luminous elements can be arranged side by side and/or one below the other.

According to a further embodiment, the display elements 322, 323, 324, 325, 318 can also each be designed as a control element by means of which a respectively stored machining angle 310, 312, 314, 316 or further functions can be selected directly. In addition, it is also possible for a machining angle to be set by means of a combination of buttons. Here, the display fields 322, 323, 324, 325, 318 can be actuated in such a way that, for example when display field 322 is actuated, machining angle 310 is set, when display field 323 is actuated, machining angle 312 is set, when display field 324 is actuated, machining angle 314 is set, and when display field 325 is actuated, machining angle 316 is set, and when display field 318 is actuated the further function is selected.

In an exemplary alignment method, a desired machining angle of the predetermined possible machining angles 310, 312, 314 is, by way of example, selected by pressing a selected display field of the display fields 322, 323, 324. If a different machining angle is to be selected, this can be set by pressing the desired display field 322, 323, 324. For example, by pressing display field 322, machining angle 310 is set, by pressing display field 323, machining angle 312 is set, and by pressing display field 324, machining angle 314 is set. If, for example, the set machining angle 310, 312, 314, 316 is to be reset, the selected display field 322, 323, 324 can be actuated again. During selection, the at least one luminous element 165, 170 is preferably switched off. During subsequent initiation of the selected machining angle 310, 312, 314, the at least one luminous element 165, 170 preferably flashes in the third luminous color. After this, the at least one luminous element 165, 170 goes out. During alignment, the display element 322, 323, 324 of the selected machining angle 310, 312, 314 preferably lights up continuously. In addition, the at least one luminous element 165, 170 lights up in the first or second luminous color, depending on the orientation or depending on the deviation from the set machining angle.

Figure 4:
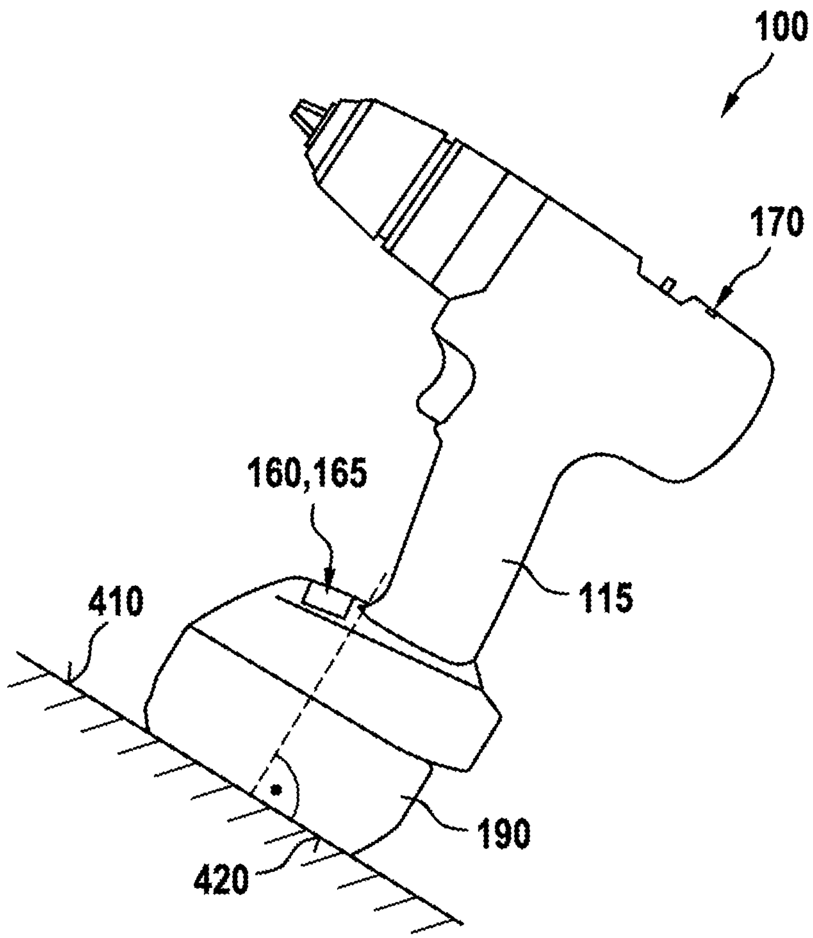
FIG. 4 shows a side view of the hand-held power tool of FIG. 1 and FIG. 2 during a first alignment step.

FIG. 4 shows the hand-held power tool 100 of FIG. 1 and FIG. 2 during a first alignment step. In this case, as described above, the hand-held power tool 100 is arranged with its reference surface 420 on the workpiece surface 410 to be machined. By way of illustration, a side of the rechargeable battery pack 190 which is arranged facing away from the handle 115 is designed as the reference surface 420. In FIG. 3, a desired machining angle 310, 312, 314, 316 is selected and initiated by means of the control unit 160 and/or an external device.

FIG. 5 shows the hand-held power tool 100 of FIG. 4 with an insertable tool 510. The insertable tool 510 is preferably a drill, screwdriver bit and/or chisel.

Figure 6:
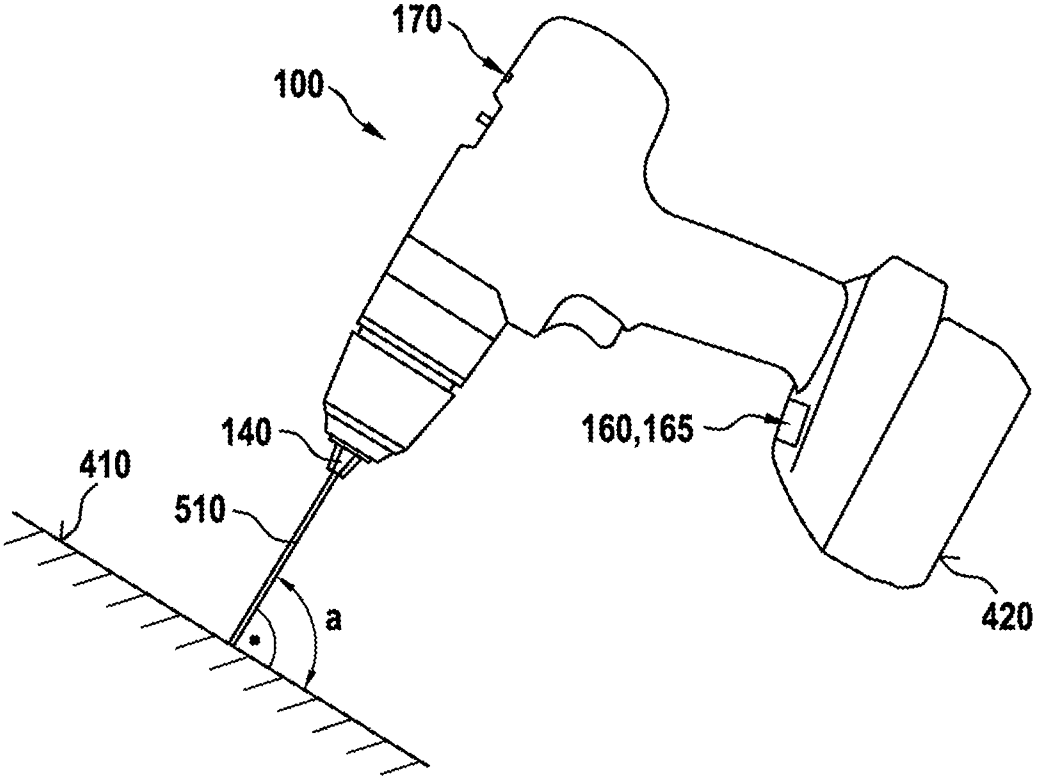
FIG. 6 shows a side view of the hand-held power tool of FIG. 5 when a set machining angle is reached.

FIG. 6 shows the hand-held power tool 100 of FIG. 4 and FIG. 5, the hand-held power tool 100 being arranged at an inclination angle a to the workpiece surface 410. In particular, the reference surface 420 of the hand-held power tool is arranged at an inclination angle a with respect to the workpiece surface 410. The above-described sensor assigned to the hand-held power tool 100 preferably detects an angle to the axis of rotation 199 of FIG. 1 or to the insertable tool 510.

FIG. 7 shows the hand-held power tool 100 of FIG. 1 and FIG. 2 with the alignment apparatus 175. According to a further embodiment, the working field lighting 330 is assigned to the alignment apparatus 175. In this case, the working field lighting 330 preferably has the at least one luminous element 170. As a particular preference, the working field lighting 330 is formed by the at least one luminous element 170.

By way of illustration, the working field lighting 330 in FIG. 7 lights up in a third luminous color 720. As described above, the third luminous color 720 is assigned to the initiation of a machining angle.

FIG. 8 shows the hand-held power tool 100 of FIG. 7, wherein the working field lighting 330 lights up in a first luminous color 820. As described above, the first luminous color 820 is emitted when the predetermined deviation exceeds the predetermined threshold value.

FIG. 9 shows the hand-held power tool 100 of FIG. 7 and FIG. 8, wherein the working field lighting 330 lights up in a second luminous color 920. As described above, the second luminous color 920 is emitted when the predetermined deviation is less than or equal to the predetermined threshold value.

It is pointed out that, in the embodiment shown in FIG. 7 to FIG. 9, the luminous element 165 of the control unit 160 additionally lights up in the respective luminous color. However, only the working field lighting 330 may be lit up. Moreover, luminous element 170 can additionally light up on the upper side 117. Furthermore, the working field lighting 330 can also flash at different flashing frequencies instead of the luminous colors. Furthermore, a combination of luminous colors and flashing frequencies, as described above, can be assigned to the working field lighting.

The invention claimed is:

1. A hand-held power tool, comprising:

a housing, in which at least one drive unit configured to drive a tool holder is arranged, wherein the tool holder is designed to hold an insertable tool;

wherein the housing includes a handle which connects an upper side of the housing and a base region of the housing to one another;

wherein the drive unit can be switched on and off by means of a manual switch arranged on the handle between the upper side and the base region, and an alignment apparatus having a control unit and having at least one luminous element, said at least one luminous element including a first luminous element arranged on the base region of the housing, wherein the alignment apparatus is designed to determine, in real time, during operation of the hand-held power tool, a current deviation of a machining angle, which is selected via the control unit and which is formed between the insertable tool that is inserted in the tool holder and a workpiece surface that is to be machined by the insertable tool, from an actual inclination angle between the insertable tool that is inserted in the tool holder and the workpiece surface to be machined by the insertable tool, and to visualize said deviation using the first luminous element.

2. The hand-held power tool as claimed in claim 1, wherein the first luminous element is designed at least to emit a first luminous color and a different second luminous color.

3. The hand-held power tool as claimed in claim 2, wherein the first luminous element emits the first luminous color when the predetermined deviation exceeds a predetermined threshold value, and emits the second luminous color when the predetermined deviation is less than or equal to the predetermined threshold value.

4. The hand-held power tool as claimed in claim 1, wherein the at least one luminous element includes a second luminous element arranged on the upper side of the housing to face away from the handle.

5. The hand-held power tool as claimed in claim 4, wherein the second luminous element is arranged at at least one of an end of upper side of the housing remote from the tool holder and at an end of the upper side adjacent to the tool holder.

6. The hand-held power tool as claimed in claim 1, wherein the first luminous element is not configured as working field lighting.

7. The hand-held power tool as claimed in claim 6, wherein the drive unit is arranged between the first luminous element and the trigger.

8. The hand-held power tool as claimed in claim 1, wherein at least one angle value is stored in the control unit and is configured to be selected as the selectable machining angle.

9. The hand-held power tool as claimed in claim 1, wherein the control unit is configured to be coupled to an external device, wherein the external device is configured to select the selectable machining angle.

10. The hand-held power tool as claimed in claim 1, wherein the control unit is arranged on an upper side, which faces the drive unit, of the base region of the housing of the hand-held power tool.

11. The hand-held power tool as claimed in claim 1, further including working field lighting is assigned to the alignment apparatus, wherein the working field lighting includes the first luminous element of the at least one luminous element.

12. The hand-held power tool as claimed in claim 11, wherein the control unit includes the working field lighting.

13. The hand-held power tool as claimed in claim 12, wherein the working field lighting is arranged below the drive unit and above a lower side of the base region.

14. The hand-held power tool as claimed in claim 13, wherein the working field lighting is arranged next to the first luminous element.

15. The hand-held power tool as claimed in claim 1, wherein the control unit includes at least one display element configured to display at least one of a device temperature, a battery state, and a connection status to an external device.

16. The hand-held power tool as claimed in claim 1, wherein the first luminous element is arranged between the trigger and a lower side of the base region.

17. The hand-held power tool as claimed in claim 16, wherein working field lighting is arranged next to the first luminous element.

18. The hand-held power tool as claimed in claim 1, wherein the drive unit is arranged on the upper side.

19. A method for aligning a hand-held power tool having an alignment apparatus, comprising:

arranging the working end of the hand-held power tool on a workpiece surface to be machined;

selecting a desired machining angle using a control unit of the alignment apparatus;

initiating adjustment of the alignment apparatus;

starting alignment of the hand-held power tool at the selected machining angle, wherein at least one luminous element of the alignment apparatus illuminates the working end of said power tool with a first luminous color as long as an actual inclination angle of the hand-held power tool exceeds a predetermined threshold value; and terminating the alignment of the hand-held power tool when the actual inclination angle of the hand-held power tool corresponds to the selected machining angle and the at least one luminous element illuminates the working end with a different second luminous color.

20. The method as claimed in claim 19, wherein the at least one luminous element illuminates the working end of said power tool with a different third luminous color when the alignment apparatus is being adjusted.

* * * * *